(12) United States Patent
Miyoshi

(10) Patent No.: US 7,215,927 B2
(45) Date of Patent: May 8, 2007

(54) RADIO COMMUNICATION APPARATUS AND RADIO TRANSMISSION METHOD

(75) Inventor: Kenichi Miyoshi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 24 days.

(21) Appl. No.: 10/538,747

(22) PCT Filed: Dec. 12, 2003

(86) PCT No.: PCT/JP03/15945

§ 371 (c)(1),
(2), (4) Date: Jun. 14, 2005

(87) PCT Pub. No.: WO2004/059891

PCT Pub. Date: Jul. 15, 2004

(65) Prior Publication Data

US 2006/0116078 A1    Jun. 1, 2006

(30) Foreign Application Priority Data

Dec. 24, 2002    (JP) .............................. 2002-372928

(51) Int. Cl.
*H04B 1/00*    (2006.01)
*H04B 7/00*    (2006.01)

(52) U.S. Cl. .................... 455/45; 455/46; 370/208; 370/210; 375/260; 375/261; 375/285

(58) Field of Classification Search ............. 455/45, 455/46; 370/338, 208, 210, 517, 329; 375/260, 375/261, 285, 295, 298, 358, 222
See application file for complete search history.

(56) References Cited

U.S. PATENT DOCUMENTS 5,726,978 A    3/1998   Frodigh et al.
6,175,550 B1   1/2001   van Nee
2001/0024427 A1    9/2001   Suzuki
2002/0193070 A1   12/2002   Kitagawa et al.
2003/0128658 A1*   7/2003   Walton et al. .............. 370/208
2003/0203721 A1*  10/2003   Berezdivin et al. ......... 455/126

FOREIGN PATENT DOCUMENTS

| JP | 10075226 | 3/1998 |
| JP | 10303849 | 11/1998 |
| JP | 11017644 | 1/1999 |
| JP | 11508417 | 7/1999 |
| JP | 2001103034 | 4/2001 |
| JP | 2001238269 | 8/2001 |
| JP | 2002141879 | 5/2002 |

* cited by examiner

OTHER PUBLICATIONS

Y. Hara, et al.; "Frame Configuration and Control Scheme in MC-CDM Systems with Frequency Scheduling," The Institute of Electronics, Information and Communication Engineers Gijutsu Kenkyu Hokoku, vol. 102, No. 206, Jul. 12, 2002, pp. 67-72 with English Abstract.

*Primary Examiner*—Matthew Anderson
*Assistant Examiner*—Tuan Pham
(74) *Attorney, Agent, or Firm*—Stevens, Davis, Miller & Mosher, LLP (57) ABSTRACT

In order to improve system throughput in a radio transmitting apparatus of a multicarrier system in which transmission is performed simultaneously to a plurality of receiving stations using subcarriers, subcarriers are divided into blocks, a receiving station is selected on a block unit basis, and the number of subcarriers per block is varied adaptively for each receiving station based on the propagation environment of that receiving station.

5 Claims, 7 Drawing Sheets

RADIO COMMUNICATION APPARATUS AND RADIO TRANSMISSION METHOD

TECHNICAL FIELD

The present invention relates to a radio communication apparatus and radio transmission method of a multicarrier transmission system.

BACKGROUND ART

Heretofore, in multicarrier transmission systems, a radio communication system has been proposed whereby subcarriers are divided into blocks and adaptive modulation is performed for each grouped plurality of subcarriers. With this kind of system, by performing adaptive modulation for each block composed of a plurality of subcarriers rather than on a subcarrier-by-subcarrier basis, feedback information (SNR or similar channel quality information) from a receiving apparatus can be provided in block units, as compared with the case where adaptive modulation is performed on a subcarrier-by-subcarrier basis, and feedback information can be reduced proportionally.

Also, when adaptive modulation parameters (modulation scheme and coding scheme) are reported to a receiving apparatus, it is not necessary to report the modulation scheme and coding scheme of all subcarriers, but instead this information can be reported on a block-by-block basis, enabling the control channel transmission rate to be lowered.

With this kind of radio communication system, the size (frequency band) of a block is fixed so as to be a value at which channel fluctuations within each block can be regarded as constant, and system operation is carried out using this fixed block size (see, for example, the document "Frame Configuration and Control Scheme in MC-CDM Systems with Frequency Scheduling," Hara et al, Technical Report OF IEICE, RCS 2002-130, pp. 67–72, July 2002).

With the conventional radio communication system shown in the above documentation, it is assumed that channel fluctuation within a block (segment) is constant. However, in an actual radio communication system, as the delay time of a delayed waveform increases, so does the amount of intra-block channel fluctuation, and there are cases where the assumption of regarding intra-block channel fluctuation as constant does not hold. Also, even in cases where there is a delayed waveform with a long delay time, if an attempt is made to make intra-block channel fluctuation constant, the block size must be made smaller, and when this is done, there is a problem in that it becomes difficult to sufficiently reduce the amount of information necessary for a control channel even if subcarriers are blocked.

Figure 1:
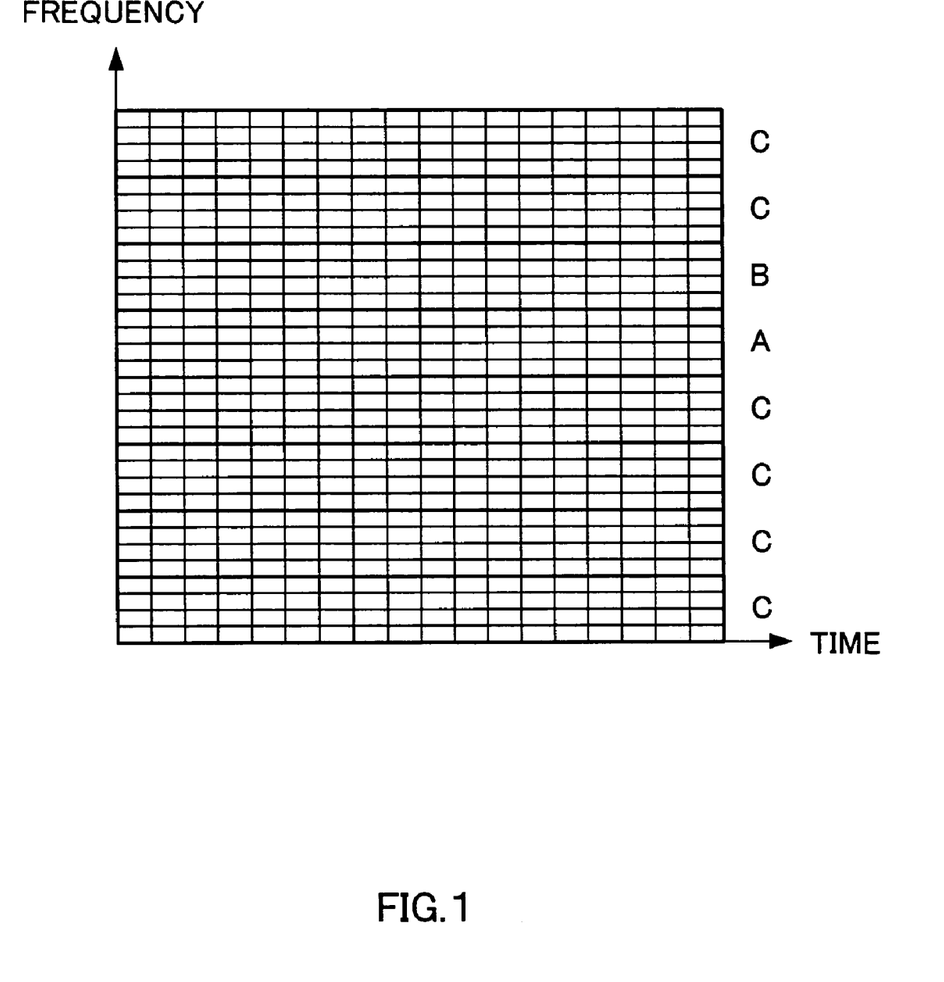
FIG. 1 is a schematic diagram provided to explain conventional assignment within blocks.

FIG. 1 is a schematic diagram showing an example of conventional block assignment. When the block size (number of subcarriers in a block) is fixed as in the example of the conventional art shown in FIG. 1, due to the occurrence of a state in which a plurality of blocks are assigned successively on the frequency axis to the same user C, the number of blocks may become unnecessarily large for the actual propagation environment. In this case, there is a problem of the amount of control information becoming unnecessarily large due to the fact that control information (modulation scheme, coding scheme, and so forth) is transmitted to the receiving apparatus on a block-by-block basis.

DISCLOSURE OF INVENTION

It is an object of the present invention to provide a radio transmitting apparatus and radio transmission method that improve system throughput.

In order to achieve this object, with the present invention, the block size (number of subcarriers) is varied adaptively for each receiving station in a multicarrier communication system.

BEST MODE FOR CARRYING OUT THE INVENTION

With reference now to the accompanying drawings, an embodiment of the present invention will be explained in detail below.

Figure 2:
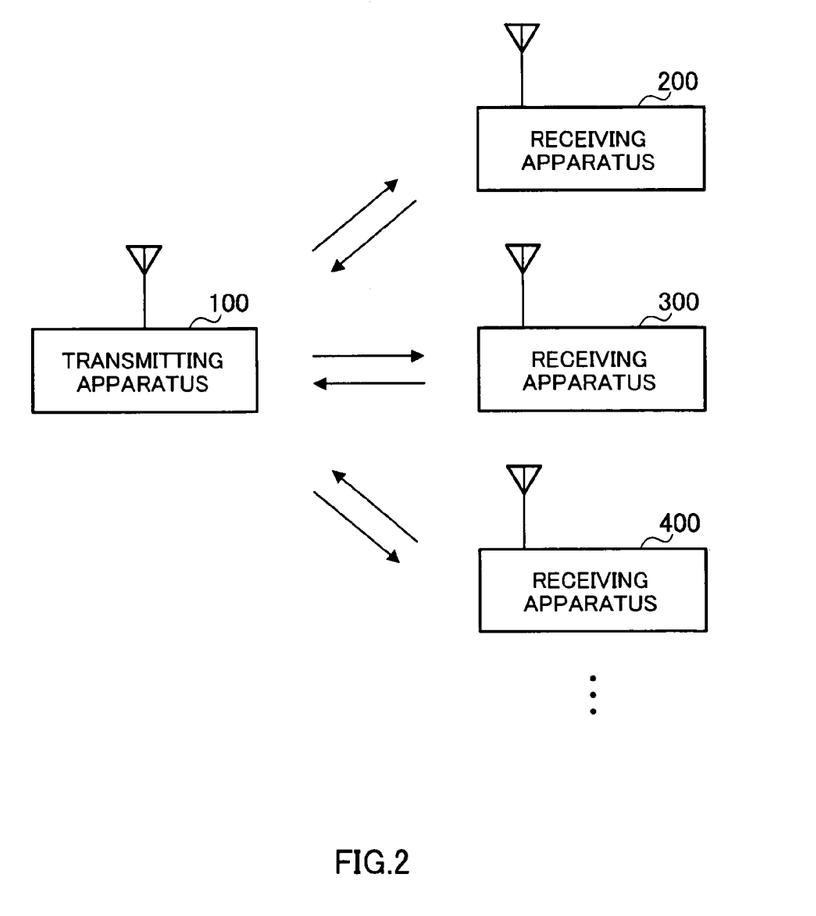
FIG. 2 is a block diagram showing the configuration of a radio communication system according to an embodiment of the present invention.

FIG. 2 is a block diagram showing the overall configuration of a radio communication system according to an embodiment of the present invention. As shown in FIG. 2, in this radio communication system, a transmitting apparatus 100 performs radio communications with a plurality of receiving apparatuses 200, 300, 400, . . . by means of a multicarrier transmission method.

Figure 3:
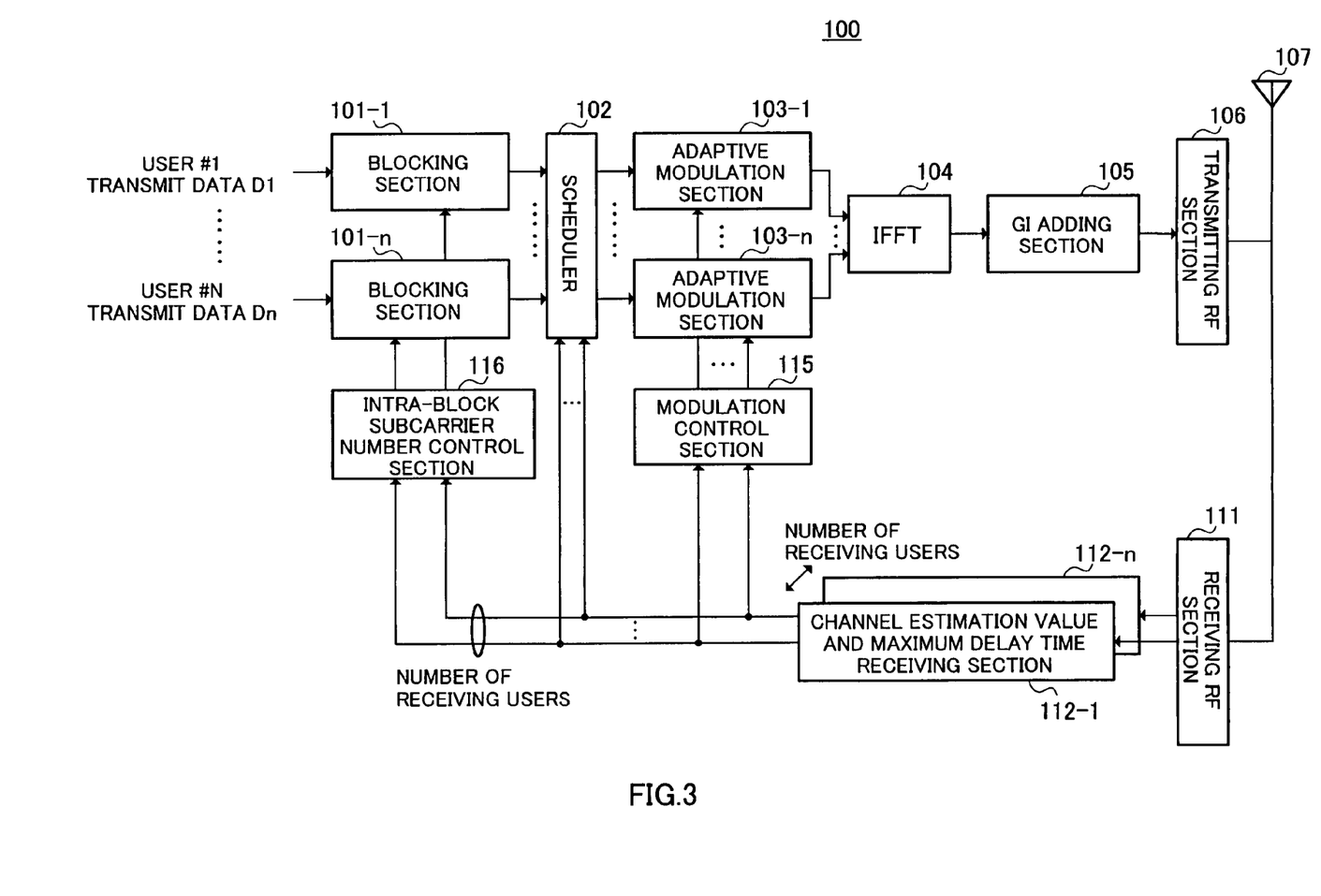
FIG. 3 is a block diagram showing the configuration of a transmitting apparatus according to an embodiment of the present invention.

FIG. 3 is a block diagram showing the configuration of transmitting apparatus 100. As shown in FIG. 3, transmitting apparatus 100 receives transmit data D1 through Dn to be transmitted to receiving apparatuses 200, 300, 400, . . . (users #1 through #n) in blocking sections 101-1 through 101-n. Blocking sections 101-1 through 101-n assign the number of subcarriers to be used for transmit data D1 through Dn based on a control signal for controlling the number of subcarriers in a block supplied from an intra-block subcarrier number control section 116, and supply these to a scheduler 102.

Scheduler 102 arranges transmit data D1 through Dn blocked in a plurality of subcarriers on the frequency axis, and supplies them to adaptive modulation sections 103-1 to 103-n respectively. Adaptive modulation sections 103-1 to 103-n perform modulation based on the determined modulation M-ary value (modulation level) for each user supplied from a modulation control section 115, and supply the results to an IFFT (Inverse Fast Fourier Transform) processing section 104.

IFFT processing section 104 generates an OFDM signal (multicarrier signal) by superimposition of the respective transmit data subcarriers, and supplies this signal to a GI (Guard Interval) adding section 105. GI adding section 105 adds a guard interval to the OFDM signal, and then supplies the resulting signal to a transmitting RF (Radio Frequency) section 106. Transmitting RF section 106 performs predetermined radio transmission processing (such as D/A conversion and up-conversion, for example) on the signal following guard interval insertion, and transmits the signal resulting from this radio transmission processing as a radio signal via an antenna 107.

A received signal received by a receiving RF section 111 via antenna 107 undergoes predetermined radio reception processing (such as down-conversion and A/D conversion, for example) in this section. Receiving RF section 111 supplies signals resulting from this radio reception processing to a number of channel estimation value and maximum delay time receiving sections 112-1 through 112-n equivalent to the number of users.

Channel estimation value and maximum delay time receiving sections 112-1 through 112-n extract a channel estimation value and maximum delay time from the received signal for each user, and supply these to modulation control section 115, scheduler 102, and intra-block subcarrier number control section 116. Modulation control section 115 performs adaptive modulation control on a block-by-block basis based on a reception power value or SNR or other channel quality information transmitted as channel estimation values from receiving apparatuses 200, 300, and 400. Intra-block subcarrier number control section 116 determines the block size (number of subcarriers) for each receiving apparatus based on the maximum delay time for each receiving apparatus. Scheduler 102 selects the receiving apparatus with the best propagation environment in each band on the frequency axis based on channel estimation values from the receiving apparatuses, and performs arrangement of blocks on the frequency axis by assigning the block of that receiving apparatus to that receiving apparatus (user).

In transmitting apparatus 100, block-by-block information relating to the subcarrier modulation scheme and coding scheme, block size (number of subcarriers), and block arrangement on the frequency axis, is transmitted on a block-by-block basis by means of a control channel.

Figure 4:
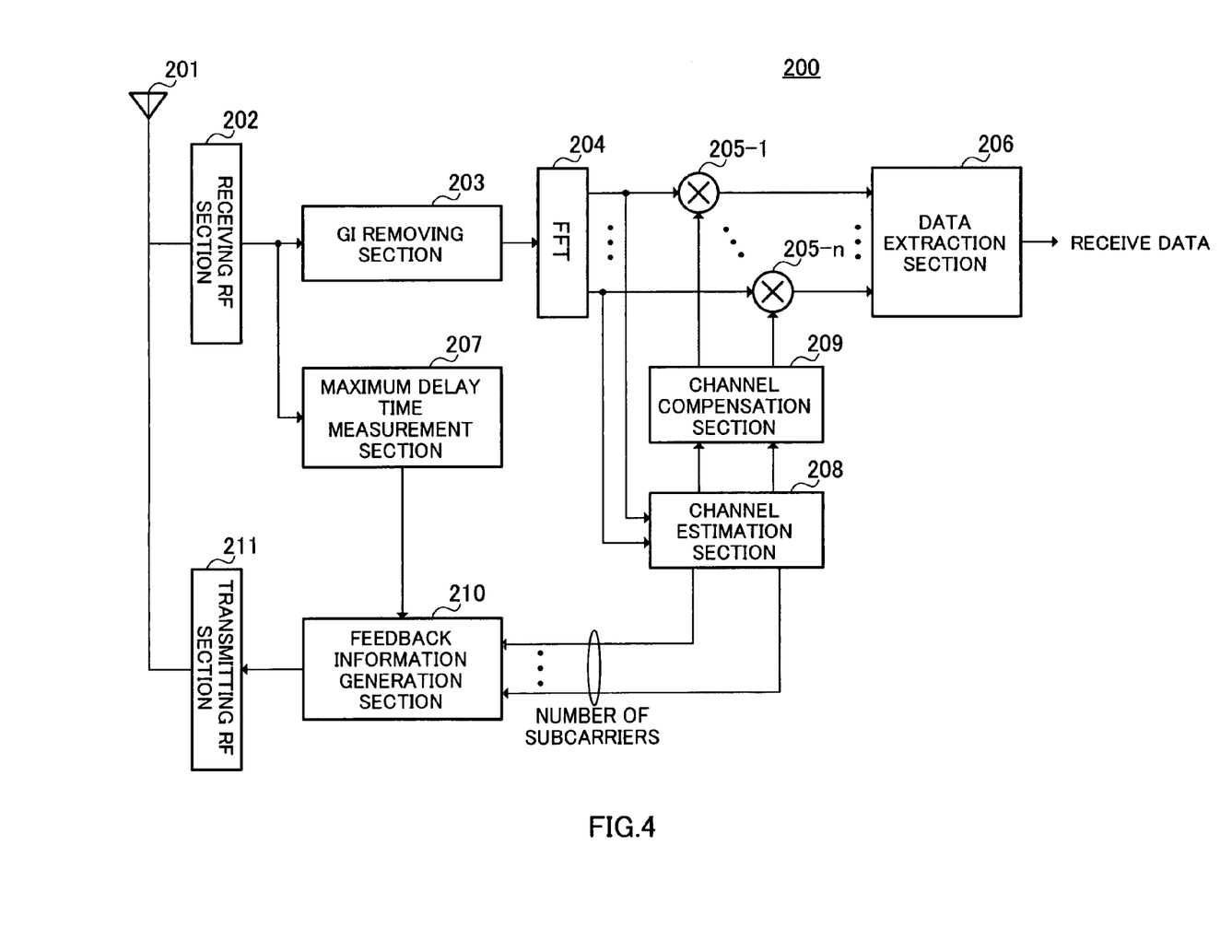
FIG. 4 is a block diagram showing the configuration of a receiving apparatus according to an embodiment of the present invention.

FIG. 4 is a block diagram showing the configuration of a receiving apparatus 200. A receiving RF section 202 performs predetermined radio reception processing such as down-conversion and A/D conversion on a received signal received via an antenna 201, and then supplies the resulting signal to a GI removing section 203 and maximum delay time measurement section 207.

GI removing section 203 removes guard intervals inserted in the signal that has undergone radio reception processing, and supplies a signal with guard intervals removed to an FFT (Fast Fourier Transform) processing section 204. FFT processing section 204 performs serial/parallel (S/P) conversion on the signal with guard intervals removed, performs FFT processing on the signal resulting from S/P conversion and performs conversion toper-subcarrier information, and supplies pilot symbols, which are known signals within these signals that have undergone FFT processing, to a channel estimation section 208 on a subcarrier-by-subcarrier basis.

Channel estimation section 208 performs channel estimation on a subcarrier-by-subcarrier basis using the pilot symbols of each subcarrier, and outputs the obtained per-subcarrier channel estimation values to a channel compensation section 209.

Channel compensation section 209 multiplies the post-FFT-processing subcarrier signals by the channel estimation values of the respective subcarriers by means of multipliers 205-1 through 205-n, and performs channel compensation for the post-FFT-processing subcarrier signals. Channel-compensated subcarrier signals are output to a data extraction section 206 where their receive data is extracted.

Maximum delay time measurement section 207 estimation values the maximum delay time from a delay profile of a received signal, and supplies the result to a feedback information generation section 210. Feedback information generation section 210 generates feedback information from maximum delay time information supplied from maximum delay time measurement section 207 and channel estimation values for the number of subcarriers supplied from channel estimation section 208, and supplies this feedback information to a transmitting RF section 211. Transmitting RF section 211 performs transmission processing such as up-conversion and D/A conversion on the feedback information, and transmits a signal that has undergone this transmission processing via antenna 201. In a radio communication system of this embodiment, through the use of FDD (Frequency Division Duplex), maximum delay time is measured on the receiving apparatus side and this is feed back to transmitting apparatus 100, but in a system that uses TDD (Time Division Duplex), the delay profile of a signal from a receiving apparatus may be measured on the transmitting apparatus side.

Figure 5A:
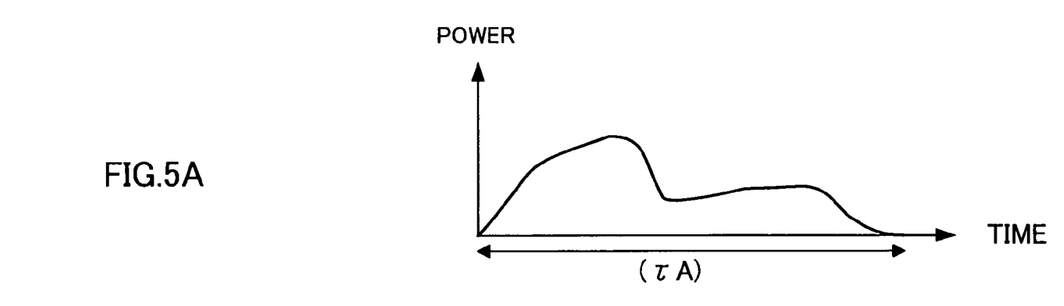
FIG. 5A is a characteristic curve diagram showing received wave delay time distribution according to an embodiment of the present invention.
Figure 5B:
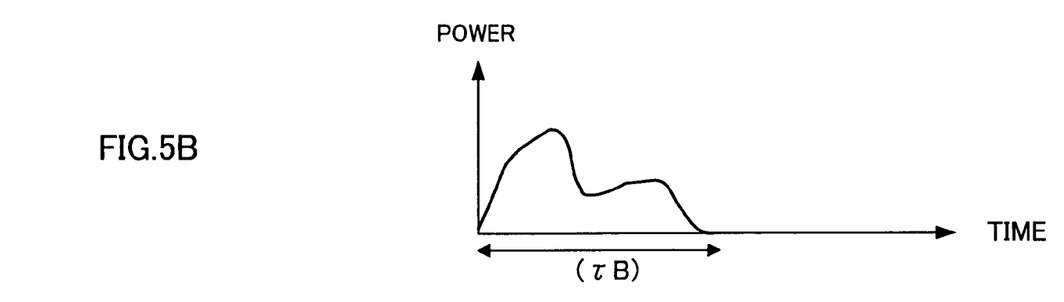
FIG. 5B is a characteristic curve diagram showing received wave delay time distribution according to an embodiment of the present invention.
Figure 5C:
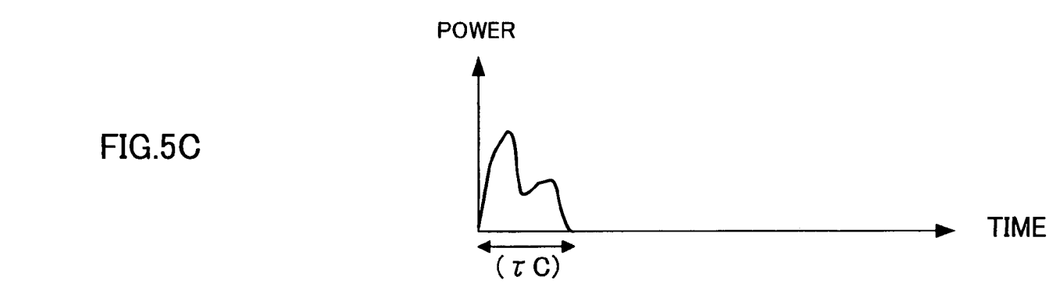
FIG. 5C is a characteristic curve diagram showing received wave delay time distribution according to an embodiment of the present invention.

Processing for assigning a number of intra-block subcarriers to receiving apparatuses 200, 300, 400, . . . using the above configurations will now be described. FIG. 5A, FIG. 5B, and FIG. 5C are characteristic curve diagrams showing maximum delay times in receiving apparatuses 200, 300, and 400.

As shown in FIG. 5A, FIG. 5B, and FIG. 5C, the maximum delay time of receiving apparatus 200 is designated τA (seconds), the maximum delay time of receiving apparatus 300 is designated τB (seconds), and the maximum delay time of receiving apparatus 400 is designated τC (seconds).

As the delay time increases, the fluctuation period on the frequency axis becomes shorter and fluctuation becomes more intense. Therefore, intra-block subcarrier number control section 116 of this embodiment reduces the number of subcarriers assigned and reduces the block size for a receiving apparatus that has a long maximum delay time, and conversely, increases the number of subcarriers assigned and increases the block size for a receiving apparatus that has a short maximum delay time.

Figure 6:
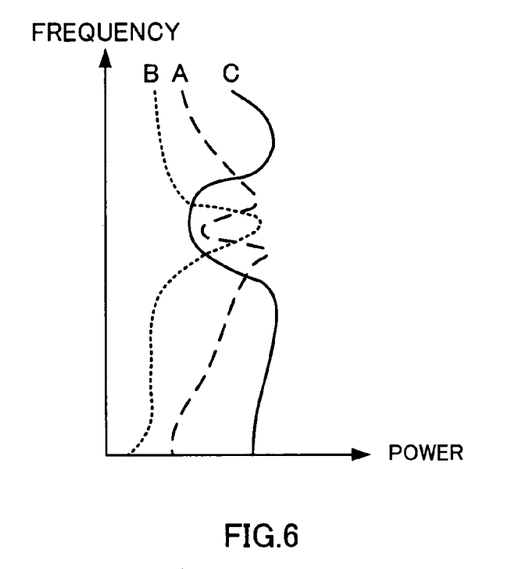
FIG. 6 is a characteristic curve diagram showing the relationship between reception power and frequency of a receiving apparatus according to an embodiment of the present invention.

By this means, as shown in FIG. 6, for example, in the case of frequency-power relationship C of receiving apparatus 400 that has a short maximum delay time, the fluctuation period is increased, whereas in the case of frequency-power relationship A of receiving apparatus 200 that has the longest maximum delay time, the fluctuation period becomes the shortest. Also, in a propagation environment in which the maximum delay time is $\tau$, channel fluctuation on the frequency axis has a frequency component of only $1/\tau$ [Hz] or less.

Figure 7:
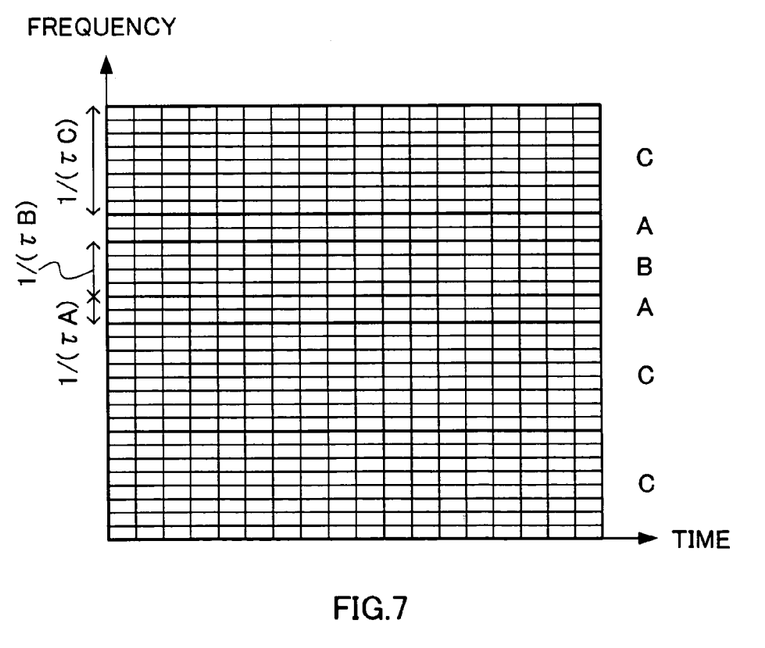
FIG. 7 is a schematic diagram provided to explain assignment within blocks according to an embodiment of the present invention.

Therefore, in such a case, as shown in FIG. 7, intra-block subcarrier number control section 116 finds frequency assignments $1/(\tau A)$, $1/(\tau B)$, and $1/(\tau C)$ from maximum delay times $\tau A$, $\tau B$, and $\tau C$ of receiving apparatuses 200, 300, and 400, and determines the number of subcarriers of each block from these values. Then assignment on the frequency axis is performed as shown in FIG. 7 by scheduler 102.

By this means, the longer the maximum delay time (the greater the propagation path fluctuation on the frequency axis) of a receiving apparatus, the smaller is the number of assigned intra-block subcarriers, and the shorter the maximum delay time (the smaller the propagation path fluctuation on the frequency axis) of a receiving apparatus, the greater is the number of assigned intra-block subcarriers. Therefore, if, for example, eight blocks are necessary when the block size is fixed as in the example of the conventional art shown in FIG. 1, with this embodiment six blocks are sufficient on the basis of a particular propagation environment. As a result, it is possible to reduce the amount of control information (the number of adaptive modulation parameters and so forth) required to be transmitted using a control channel for each block.

Figure 8:
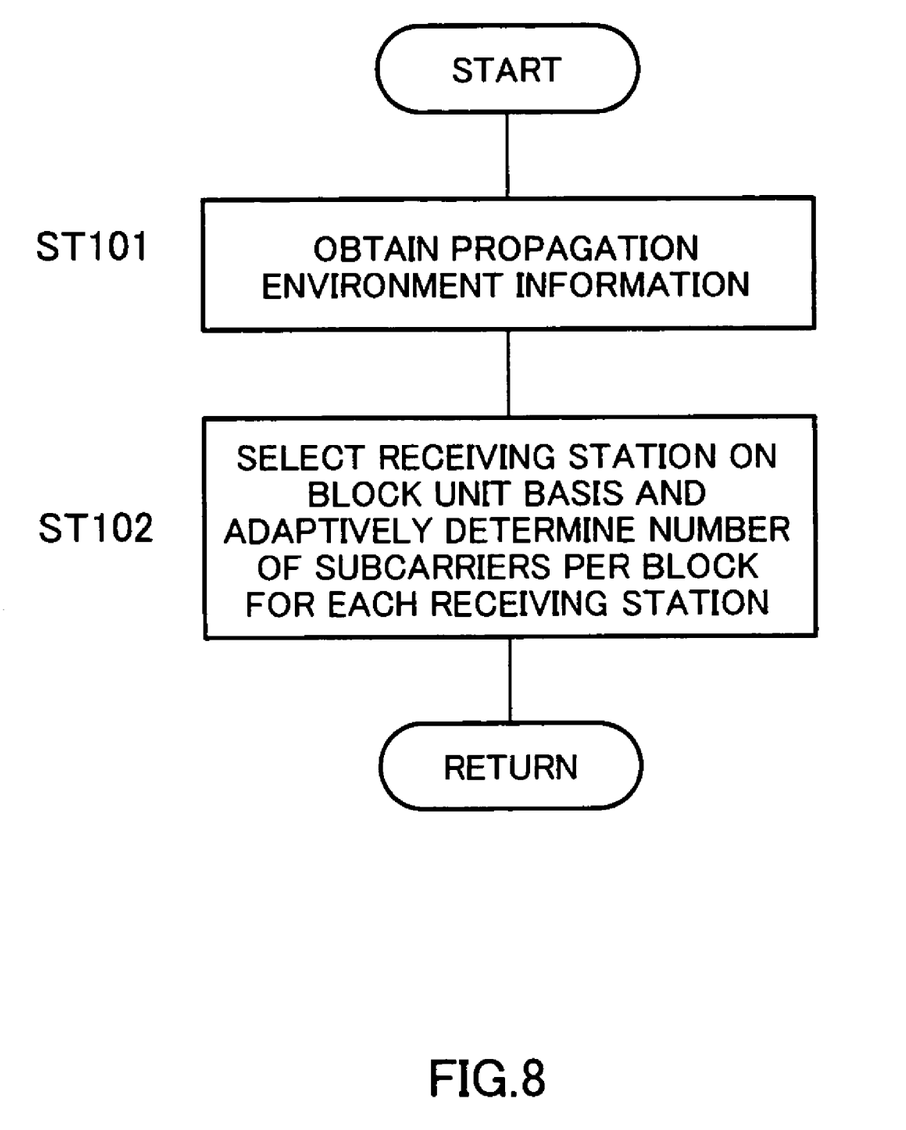
FIG. 8 is a flowchart showing the block assignment processing procedure of a transmitting apparatus according to an embodiment of the present invention.

FIG. 8 is a flowchart showing the control processing procedure in intra-block subcarrier number control section 116 of transmitting apparatus 100. As shown in FIG. 8, intra-block subcarrier number control section 116 obtains propagation environment information (maximum delay times) for each receiving apparatus from channel estimation value and maximum delay time receiving sections 112-1 through 112-n in step ST101, and then proceeds to step ST102 and determines the number of subcarriers per block based on this propagation environment information. In this case, the smallest number of subcarriers such that intra-block channel fluctuation becomes constant is determined. Specifically, if the subcarrier bandwidth is designated W [Hz], by determining the number of subcarriers per block so as to be W×τmax [subcarriers] for maximum delay time τmax, the smallest number of subcarriers such that intra-block channel fluctuation becomes constant can be selected.

The number of subcarriers of each block determined by intra-block subcarrier number control section 116 in this way are assigned by blocking sections 101-1 through 101-n. The blocks are then arranged on the frequency axis by the scheduler 102. In this case, scheduler 102 finds the relationships between reception power and frequency shown in FIG. 6 based on feedback information (channel estimation values) obtained from receiving apparatuses 200, 300, and 400 respectively, and performs block arrangement based on these relationships.

Thus, according to transmitting apparatus 100 of this embodiment, by enabling a number of subcarriers to be determined for each of a plurality of receiving stations (receiving apparatuses 200, 300, 400, . . . ), it is possible to eliminate unnecessary subcarrier assignment, and also to decrease the amount of control channel information and reduce interference with other cells. Also, by determining the number of subcarriers per block in accordance with the maximum delayed waveform delay time of a received signal received by a receiving apparatus, it is possible to select a number of subcarriers appropriate for the propagation environment. Furthermore, if the subcarrier bandwidth is designated W [Hz], by determining the number of subcarriers per block so as to be W×τmax [subcarriers] for maximum delay time τmax, it is possible to select the smallest number of subcarriers such that intra-block channel fluctuation becomes constant, and as a result, a sufficient necessary number of subcarriers can be selected.

A transmitting apparatus and receiving apparatus according to this embodiment are suitable for provision in a radio communication terminal apparatus and radio communication base station apparatus used in a mobile communication system.

As described above, according to the present invention, by dividing subcarriers into blocks, selecting a receiving station on a block unit basis, and adaptively varying the number of subcarriers per block for each receiving station based on the propagation environment of that receiving station, it is possible to determine the number of subcarriers for each of a plurality of receiving stations, and to eliminate unnecessary subcarrier assignment. It is thus possible to improve system throughput.

This application is based on Japanese Patent Application No. 2002-372928 filed on Dec. 24, 2002, the entire content of which is expressly incorporated by reference herein.

INDUSTRIAL APPLICABILITY

The present invention is applicable to a radio communication terminal apparatus and radio communication base station apparatus used in a mobile communication system.

The invention claimed is:

1. A radio transmitting apparatus of a multicarrier system in which data is transmitted using subcarriers, said radio transmitting apparatus comprising:
a blocking section that divides the subcarriers into blocks;
a scheduler that selects a receiving station on a block unit basis; and
a controller that varies a number of subcarriers per block for each receiving station, wherein:
said controller determines the number of subcarriers per block based on a maximum delay time of a signal received by the receiving station.

2. The radio transmitting apparatus according to claim 1 wherein said controller determines the number of subcarriers per block W×$\tau_{max}$ subcarriers, where W is a bandwidth of each of the subcarriers and $\tau_{max}$ is the maximum delay time.

3. A radio communication terminal apparatus equipped with the radio transmitting apparatus according to claim 1.

4. A radio communication base station apparatus equipped with the radio communication apparatus according to claim 1.

5. A radio transmission method of a multicarrier system in which transmission is performed using subcarriers, said method comprising:
(a) dividing the subcarriers into blocks:
(b) selecting a receiving station on a block unit basis; and
(c) varying a number of subcarriers per block for each receiving station, wherein:
in step (c), the number of subcarriers per block is determined based on a maximum delay time of a signal received by the receiving station.

* * * * *